W. A. BRICKILL.
CAR AXLE.
No. 66,556.                                    Patented July 9, 1867.
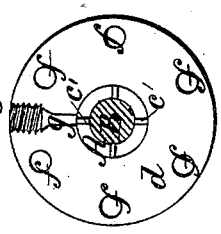
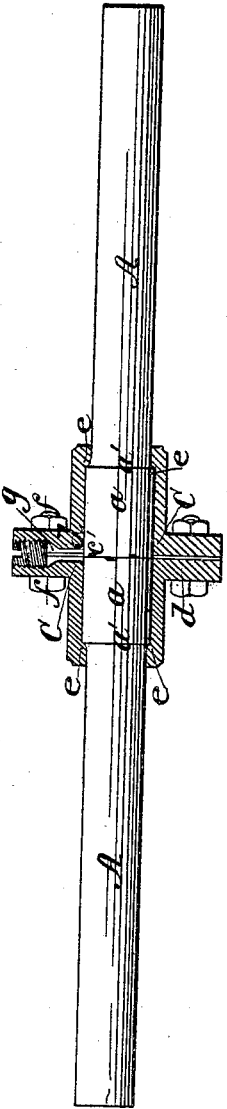
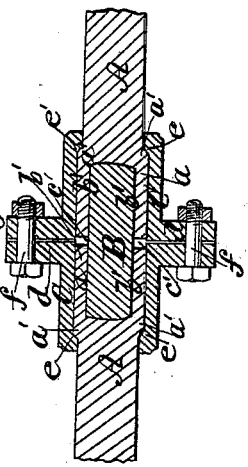
Witnesses;
Inventor;
W. A. Brickill

United States Patent Office.

W. A. BRICKILL, OF NEW YORK, N. Y., ASSIGNOR TO HIMSELF AND J. A. STERLING, OF SAME PLACE.

Letters Patent No. 66,556, dated July 9, 1867.

IMPROVED CAR-AXLE.

The Schedule referred to in these Letters Patent and making part of the same.

TO ALL WHOM IT MAY CONCERN:

Be it known I, W. A. BRICKILL, of the city, county, and State of New York, have invented certain new and useful Improvements in Divided Axles for Cars, &c.; and I do hereby declare that the following is a full, clear, and exact description of the same, reference being had to the accompanying drawings, making a portion of this specification, in which—

Figure 1 is a side view and partial section of an axle constructed according to my invention.

Figure 2 is a central longitudinal section of the same.

Figure 3 is an end view of one of the halves or parts of the same.

Similar letters of reference indicate corresponding parts in all the figures.

This invention consists in the combination of a central supporting pin with the bored and enlarged inner ends of the two parts of a divided axle and the flanged collars which hold the aforesaid parts together, whereby the central portion of the axle is prevented from sagging or bending without interfering in the least with the independent movement of the two parts thereof.

To enable others to understand the construction and operation of my invention, I will proceed to describe it with reference to the drawings.

The two halves or parts of the axle, to the outer ends of which are secured the wheels of the car or other vehicle, are indicated at A, and the inner end portion of each one is enlarged, as shown at $a$, such enlarged portions being, like the other parts of the axle, cylindrical in form. Each of the said enlarged portions $a$ has its outermost end formed with an annular shoulder, $a'$, and its inner end resting square against that of the corresponding enlarged portion $a$ of the other half or part A of the axle, as represented in fig. 2. The enlarged ends or portions $a$, just described, are bored out or formed with cylindrical recesses $b'$, and placed in these recesses, and extending across the joint between the parts A, is a cylindrical pin, B, which, being snugly fitted into the recesses just mentioned, and being made of a suitable or sufficient length and thickness, sustains the two parts A in line with each other, and thus prevents the axle from sagging or being depressed at the centre thereof. C represents two collars, each of which has formed upon its inner end an outwardly extending flange, $d$, and is furnished at its outer end with an inwardly extending flanch, $e$, so that the said collars being placed one upon each of the parts A, with its flanch $e$ resting against the shoulder $a'$ of the enlarged portion $a$, and the said collars being firmly secured together by bolts $f$ passed through the flanges $d$, the two parts A will be securely held with their inner ends nearly or quite in contact, as shown in figs. 1 and 2, so that, by these means, while the two parts A of the axle are held together by the collar C, as just set forth, the pin B strengthens or supports the inner ends of the said parts against any tendency to sag or become depressed, without interfering in the least with the separate or independent movement of either part A or the wheel attached thereto, required more especially when the car or vehicle is required to turn over or traverse a curve. To facilitate the lubrication of the pin $c$ the recesses $b'$, in which the said pin is situated, communicate by grooves $c'$, formed radially in the ends of the parts A, with an oil receptacle, $g$, provided in the flanges $d$ of the collars C, the aforesaid pin being furnished with longitudinal grooves in its surface to distribute the oil throughout its entire length.

What I claim as my invention, and desire to secure by Letters Patent, is—

The combination of the supporting-pin B, the bored and enlarged inner ends of the two parts A of the axle, and the collars C, substantially as and for the purpose specified.

W. A. BRICKILL.

Witnesses:
GEO. W. REED,
J. W. COOMBS.